US006980980B1

(12) United States Patent
Yeh

(10) Patent No.: US 6,980,980 B1
(45) Date of Patent: Dec. 27, 2005

(54) SUMMARY-DETAIL CUBE ARCHITECTURE USING HORIZONTAL PARTITIONING OF DIMENSIONS

(75) Inventor: Adam E. C. Yeh, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 340 days.

(21) Appl. No.: 10/050,663

(22) Filed: Jan. 16, 2002

(51) Int. Cl.[7] .............................................. G06F 17/30
(52) U.S. Cl. ...................... 707/2; 707/3; 707/8; 707/10; 345/738; 345/751
(58) Field of Search ............................. 707/2–3, 10, 8, 707/200; 345/738, 751, 1.3

(56) References Cited

U.S. PATENT DOCUMENTS

| | | | |
|---|---|---|---|
| 6,094,651 A | | 7/2000 | Agrawal et al. |
| 6,134,541 A | | 10/2000 | Castelli et al. |
| 6,330,564 B1 | | 12/2001 | Hellerstein et al. |
| 6,708,172 B1 | * | 3/2004 | Wong et al. .................. 707/10 |
| 2002/0099692 A1 | * | 7/2002 | Shah et al. ..................... 707/2 |
| 2003/0115194 A1 | * | 6/2003 | Pitts et al. ..................... 707/3 |

OTHER PUBLICATIONS

Agrawal, et al., "Modeling Multidimensional Databases," Proceedings of the 13th International Conference on Data Engineering, 1997, 23 pages, Birmingham, U.K.
Dinter et al., "The OLAP Market: State of the Art and Research Issues," Conference on Information and Knowledge Management, 1998, pp. 22-27, ACM Press, New York, NY.
Yang et al., "Accessing Data Cubes Along Complex Dimensions," Conference on Information and Knowledge Management, 1999, pp. 73-78, ACM Press, New York, NY.

Pourabbas, et al., "Characterization of Hierarchies and Some Operators in OLAP Environment," Conference on Information and Knowledge Management, 1999, pp. 54-59, ACM Press, New York, NY.
Hurtado et al., "Updating OLAP Dimensions," Conference on Information and Knowledge Management, 1999, pp. 60-66, ACM Press, New York, NY.
Golfarelli et al., "A Methodological Framework for Data Warehouse Design," Conference on Information and Knowledge Management, 1998, pp. 3-9, ACM Press, New York, NY.
Fu et al., "CubiST: A New Algorithm for Improving the Performance of Ad-hoc OLAP Queries," Conference on Information and Knowledge Management, 2000, pp. 72-79, ACM Press, New York, NY.
Trujillo et al., "An Object Oriented Approach to Multidimensional Database Conceptual Modeling (OOMD)," Conference on Information and Knowledge Management, 1998, pp. 16-21, ACM Press, New York, NY.

* cited by examiner

Primary Examiner—Charles Rones
Assistant Examiner—Belix M. Ortiz
(74) Attorney, Agent, or Firm—Senniger Powers

(57) ABSTRACT

A database architecture and method for processing data in a multidimensional database, including performing Web usage analysis. A summary cube contains the members of an upper level of a dimension and a detail cube contains a subset of the members of a lower level of the dimension partitioned therefrom based on a selected member of the upper level of the dimension. The detail cube also includes one or more sub-cubes containing aggregations of the first subset of the lower level members. An XML template implements a workflow to automatically create a second detail cube partitioned from the dimension based on another selected member of the upper level. Using XML metadata, the invention implements zoom in/zoom out events to navigate between information in the summary cube and information in the detail cubes.

60 Claims, 8 Drawing Sheets

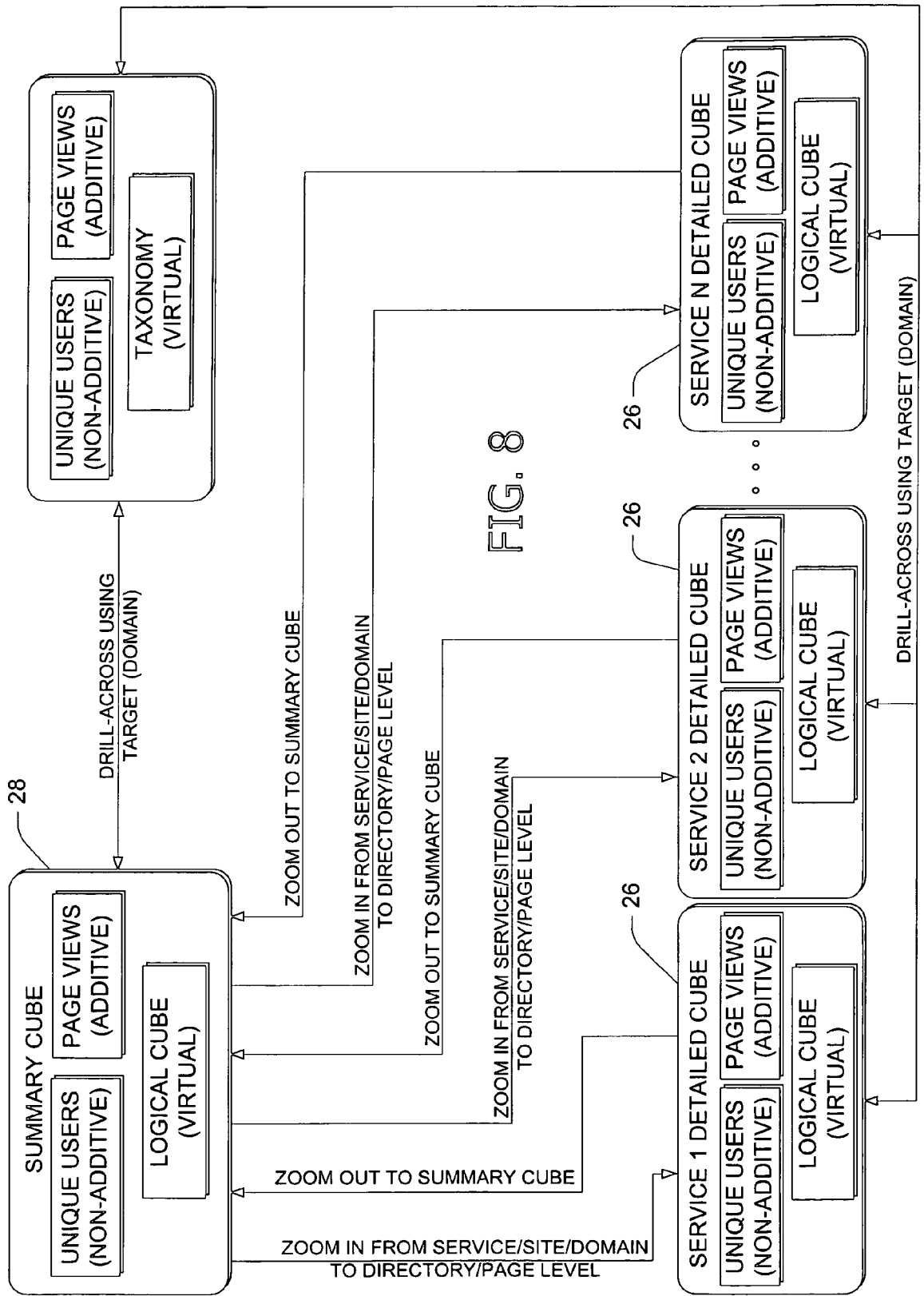

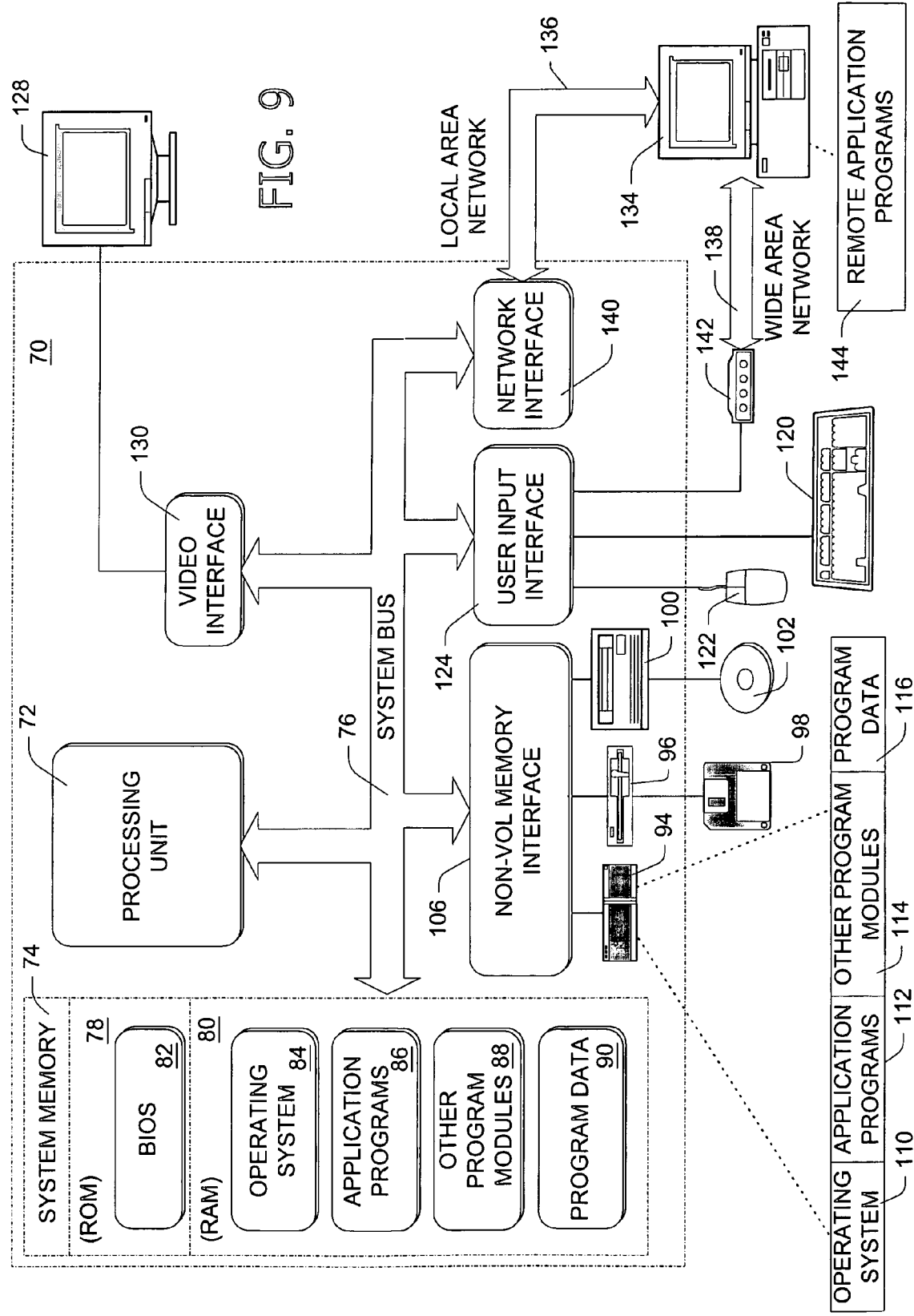

SUMMARY-DETAIL CUBE ARCHITECTURE USING HORIZONTAL PARTITIONING OF DIMENSIONS

TECHNICAL FIELD

The present invention relates to the field of information retrieval and database processing. In particular, this invention relates to horizontal partitioning of dimensions to organize a multidimensional database according to a database architecture that employs summary cubes and detail cubes for improved processing of large dimensions and user navigation experience.

BACKGROUND OF THE INVENTION

Data processing in a large-scale, enterprise application often presents usability, manageability, and scalability problems due to the large volume of data. For example, Web sites generate gigabytes of data every day to describe actions made by visitors to the sites. In fact, the average number of hits on a popular network of Web sites can reach 1.5 billion hits per day or more. This data has several dimensions, such as where each visitor came from, the time of day, the route taken through the site, and the like. Moreover, the amount of data continually increases as the number of Web services and the amount of business they conduct increases. Therefore, processing the large amount of data to produce meaningful usage reports and clickstream analysis for a network of sites involves overcoming several challenges.

Online analytical processing (OLAP) is well known to those skilled in the art for handling relatively complex database queries in a multidimensional database. In general, OLAP applications model data by a multidimensional database, often referred to as a data cube, and permit access to the data for functions such as summarizing, consolidating, performing calculations on, and indexing the data. To create an OLAP cube from a collection of data, some attributes associated with the data are identified as facts while others are used as dimensions. A dimension usually arranges data according to a hierarchy to provide different levels of granularity for viewing the data.

Unfortunately, the amount of data and size of physical entities (e.g., html pages, Web site directories) for network Web usage reporting has accumulated faster than conventional OLAP products and user interface tools can handle, which prevents them from performing satisfactorily on the server and client sides. For example, in a large-scale, enterprise implementation of an OLAP application, large dimensions (e.g., those having more than 500,000 members) present problems in terms of development and operation for a production system. Two significant factors that influence the design of a large-scale OLAP application are the scalability for the application on the server side and the usability for users using a client tool.

Large dimensions generally cause the performance and usability problems described above. First, most commercial OLAP implementations require dimensions to be loaded to memory first to improve query-time performance. A large dimension does not scale well because of the limitation on the available memory addressable space in a hardware platform. Second, the client machine memory and CPU cycles as well as the inherent problems of presenting a large number of selections to users limits usability. In this regard, users are unable to navigate through thousands of dimension members in any presently available clients to find the members of interest to the users.

Presently available OLAP implementations, however, only permit fact-based partitioning of data and do not support dimension-based partitioning strategies to mitigate problems caused by large dimensions. Therefore, improvements in data processing are desired to reduce processing time for large databases and to provide "overview" reporting (e.g., at the domain level) yet enable site specific groups to review business performance data on a detail level (e.g., at the page level). Further improvements in manageability and usability are also desired.

SUMMARY OF THE INVENTION

The invention meets the above needs and overcomes one or more deficiencies in the prior art by providing improved information retrieval and data processing. According to one aspect of the invention, horizontal partitioning of dimensions permits a multidimensional database to be organized into summary cubes and detail cubes. The summary-detail cube architecture is particularly beneficial for processing large dimensions in a large-scale, enterprise implementation of an OLAP application and provides improved scalability for the application on the server side and improved usability for users on the client side. With respect to network Web usage data, the invention enables both overview reporting (e.g., at the domain level) and site specific reporting (e.g., at the directory or page level). The summary-detail cube architecture enables Web networks, for example, to scale as many members as desired on page and directory levels because the dimensions are horizontally partitioned based on, for example, a higher dimension level for Web services. In addition to improved scalability, the summary-detail architecture provides improved navigation and, thus, usability from a user interface perspective. The detail cubes enable users to drill down to specific information without being forced to process the entire collection of records on these lower levels. In this regard, a feature of the present invention also permits users to roll up from the detail cubes to the summary cube. Another aspect of the invention improves manageability with a workflow implementation that automates cloning of detail cubes, which reduces overhead for maintaining the OLAP application when additional detail cubes are needed. Advantageously, the architecture of the present invention can be implemented on an existing OLAP service or analysis service framework. Moreover, the features of the present invention described herein are economically feasible and commercially practical.

Briefly described, a data structure embodying aspects of the invention includes a general dimension, a summary cube, and a partitioned dimension. The general dimension is partitioned based on a selected member of an upper level to form the partitioned dimension. The summary cube contains the members of the upper level of the general dimension and the partitioned dimension contains a subset of the members of a lower level of the general dimension. The subset of the lower level members corresponds to the selected upper level member.

Another embodiment of the invention is directed to a method of processing data in a multidimensional database. The method includes defining a plurality of dimensions, partitioning at least one of the dimensions, and defining a summary cube. The partitioned dimension contains a subset of the members of at least one lower level of the dimension to be partitioned based on a selected member of an upper level of the dimension. The summary cube contains the upper level members.

Yet another aspect of the invention is embodied by one or more computer-readable media having computer-executable instructions for performing a method of processing data in a multidimensional database.

In another embodiment, one or more computer-readable media have computer-executable components for processing data. The components include a summary cube database component and a first partitioned database component. According to the invention, the summary cube database component stores the members of an upper level of a dimension. The first partitioned dimension component contains a first subset of the members of a lower level of the dimension. The first subset of the lower level members is partitioned from the dimension based on a selected member of the upper level. A first detail cube database component includes the first partitioned dimension component and one or more sub-cubes containing aggregations of the first subset of the lower level members. The components also include an extensible markup language (XML) template component for implementing a workflow to automatically create a second partitioned dimension component and a second detail cube database component. The second partitioned dimension component contains a second subset of the lower level members, which is partitioned from the dimension based on another selected member of the upper level. The second detail cube database component includes the second partitioned dimension component and one or more sub-cubes containing aggregations of the second subset of the lower level members.

In yet another embodiment, one or more computer-readable media having computer-executable components for processing data embody aspects of the invention. The components include a summary cube database component and a detail cube database component that have the same dimensionality. The components also include a partitioned dimension component. In this embodiment, the summary cube database component stores the members of an upper level of a dimension. The partitioned dimension component contains a subset of the members of a lower level of the dimension in addition to the upper level members associated with the summary cube database component. The subset of the lower level members is partitioned from the dimension based on a selected member of the upper level. The detail cube database component includes the partitioned dimension component and one or more sub-cubes containing aggregations of the subset of the lower level members. The components also include a navigation component for implementing zoom in/zoom out events to navigate between information in the summary cube database component and information in the detail cube database component.

Yet another embodiment of the invention is directed to a method of performing clickstream analysis from Web usage data in a multidimensional database. The method includes defining a target dimension, partitioning the target dimension, and defining a summary cube. The target dimension contains members of a plurality of levels, one of which is a service level containing members representative of a plurality of Web services. The partitioning of the target dimension is based on a selected member of the service level. The partitioned dimension contains a subset of the members of a level of the target dimension lower in the hierarchy than the service level. The summary cube contains the members of the service level of the target dimension.

Alternatively, the invention may comprise various other methods and apparatuses.

Other features will be in part apparent and in part pointed out hereinafter.

BRIEF DESCRIPTION OF THE DRAWINGS

FIG. 8 is a block diagram zoom in/zoom out and drill across navigation according to the architecture of FIG. 4.

FIG. 9 is a block diagram illustrating components of a computer for use in the system of FIG. 6.

Corresponding reference characters indicate corresponding parts throughout the drawings.

DETAILED DESCRIPTION OF THE INVENTION

The present invention relates to a summary-detail cube database architecture for improved processing of large dimensions and user navigation experience. As described above, the large volume of data often presents usability, manageability, and scalability problems when processing data in a large-scale, enterprise implementation of an OLAP application. One such large-scale application involves Web usage reporting. As is well known in the art, the growing popularity of the global network referred to as the Internet has significantly increased the number of users and the number of Web sites providing services to users, including providing various types of information, offering products or services for sale, and providing games or other forms of entertainment. One embodiment of the invention is particularly useful for processing large amounts of Web usage data. In this instance, the summary-detail cube architecture enables both overview reporting (e.g., at the domain level) and site specific reporting (e.g., at the directory or page level).

Figure 1:
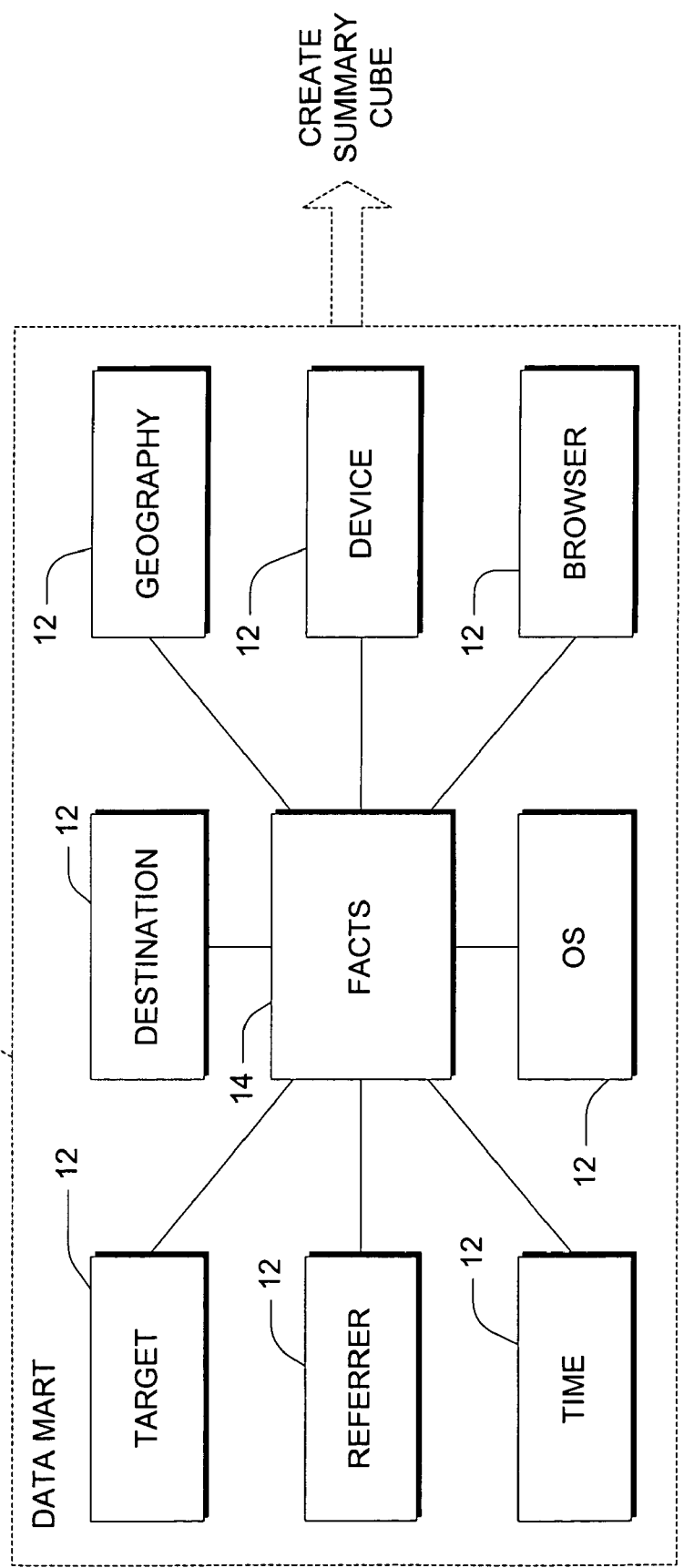
FIG. 1 is a block diagram illustrating an exemplary multidimensional data model according to one embodiment of the invention.

Referring now to FIG. 1, an exemplary data mart 10 contains data relating to Web usage for a plurality of services. The data has several dimensions 12, such as where each site visitor resides, the time of day, the route taken through the site, and the like. In this particular example, the data mart 10 is modeled according to a star dimensional model schema in which a set of facts 14 is surrounded by multiple dimensions 12, which describe the facts 14. As shown in FIG. 1, the dimensions 12 include Web usage data such as the user's destination page; the user's geographic location; the user's client device, operating system, and browser; the time at which the user accessed a particular Web page; the site that referred the user to the next site; and a target dimension (described in greater detail below). The present invention partitions data mart 10 to create summary and detail cubes, shown generally at reference character 18 (see FIG. 6).

In general, the invention's summary-detail cube architecture for the data mart 10 of FIG. 1 provides different levels of granularities in summary and detail cubes 18 to improve the scalability and the usability of a large-scale, enterprise OLAP application. The invention includes dimension-based horizontal partitioning, a workflow driven by XML templates for cloning detail cubes, and a user interface zoom in/out functionality using summary and detail cubes driven by XML metadata.

Figure 2:
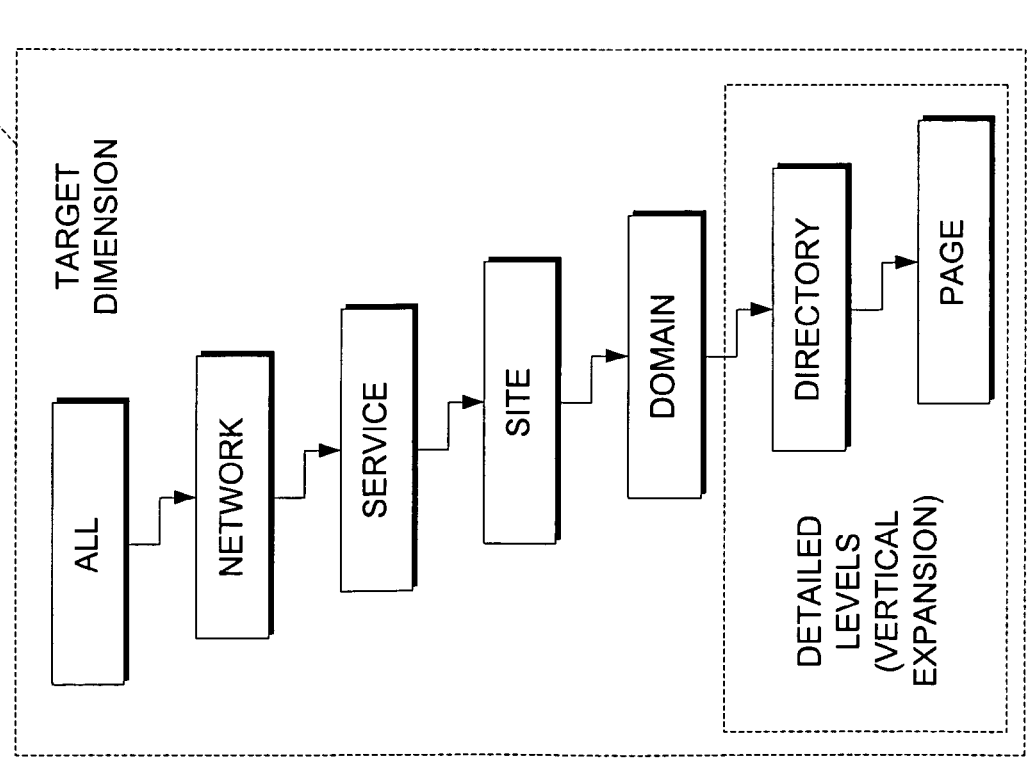
FIG. 2 is a block diagram illustrating an exemplary dimension of the model of FIG. 1.

FIG. 2 is a block diagram illustrating an exemplary dimension of the data mart model of FIG. 1. In one embodiment, dimension 12, referred to as "Target" in FIG. 2, provides a physical taxonomy for Web usage analysis. This general dimension 12 has a number of levels arranged in the hierarchy shown in FIG. 2. The exemplary Target dimension provides Web usage information. For example, for the MSN® networks of Internet services, the levels in the dimension may include: Network (e.g., MSN® networks), Service (e.g., CarPoint® automotive service), Site (e.g., CarPoint® site), Domain (e.g., carpoint.msn.com), Directory (e.g., carpoint.msn.com/homepage/), and Page (e.g., default.asp). As an example, networks such as the ones described herein generate the volume of dimension data shown in Table I, below, after the database has been online for several months.

TABLE I

| DIMENSION<br>LEVEL NAME | NUMBER OF<br>MEMBERS |
|---|---|
| Network | 7 |
| Service | 66 |
| Site | 592 |
| Domain | 1911 |
| Directory/Subdirectory | 1,237,443 |
| Page | 4,200,513 |

In a typical OLAP application, the architecture defines dimensions to allow a user to examine facts 14 from different perspectives (i.e., to look at the metrics). When a dimension grows to an unmanageable size, the user has difficulty in using it to manipulate the metrics for analysis. Moreover, performance problems worsen during aggregations because the increased number of permutations that the system must calculate triggers a greater degree of data explosion and increases the amount of physical memory needed when loading the dimensions.

Referring further to FIG. 2, the large amount of data on the directory and page levels of the Target dimension 12 makes navigation through the dimension members quite difficult when users work with the metrics. Nevertheless, directory/page level information is typically more relevant to a service or site because they are physically correlated. Users who are site property owners desire to drill down specific directory/page level information for their analyses. For example, an analyst of one Web service (e.g., CarPoint) is unlikely to drill down on the directory and page level information for another Web service (e.g., Encarta) because the information has little if any bearing on the performance of the first service. In a conventional OLAP implementation, however, specific page level members associated with the one Web service unavoidably coexist with the specific page level members of the other Web service because they are stored in the dimension. The vast amount of information present in the dimension when a user drills down to the page level prevents the conventional OLAP application from performing satisfactorily.

Figure 3:
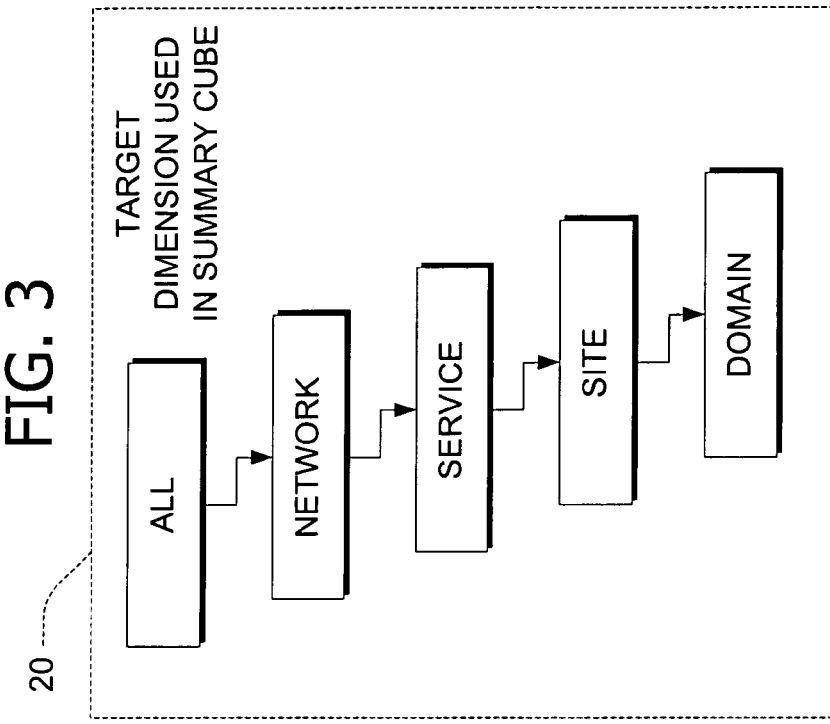
FIG. 3 is a block diagram illustrating an exemplary summary cube dimension from the dimension of FIG. 2.

FIG. 3 is a block diagram illustrating an exemplary summary cube Target dimension 20 from the Target dimension 12 of FIG. 2. In addition to detailed information, users often desire more general, overview information. Thus, it is important to provide users with a summary level of Web usage to inform them of the general performance of the networks. The present invention partitions dimension 12 to form the Target dimension 20 used in a summary cube 28 (see FIG. 4) along with one or more partitioned dimensions 22 (used to form detail cubes 26; see FIG. 4). In the example of FIGS. 2 and 3, summary cube Target dimension 20 includes all members of the upper levels network, service, site, and domain. The detail cube Target dimension 22 is created for each member of the service level and contains the sub-tree of a selected service, extending to the directory/page levels. In other words, partitioned Target dimension 22 includes the specific directory level and page level members corresponding to a selected Web service member.

Figure 4:
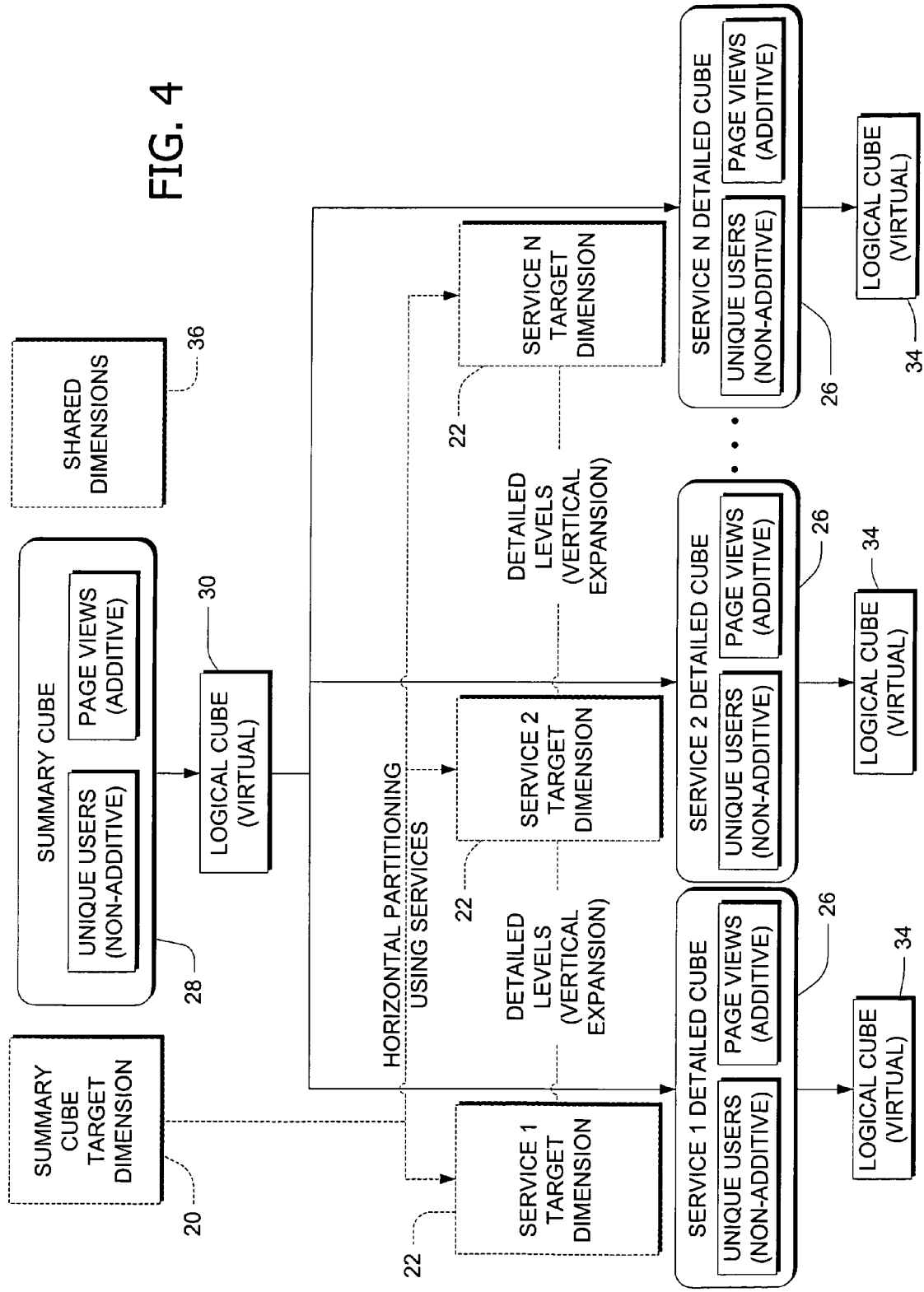
FIG. 4 is a block diagram illustrating a summary-detail cube architecture according to one embodiment of the invention for processing the data of the model of FIG. 1.

FIG. 4 illustrates the summary-detail cube architecture according to one embodiment of the invention for a Web usage reporting OLAP application. In general, processing an OLAP data cube, such as cube 18, involves reading dimension 12 to populate the cube levels with members from the actual data, reading facts 14, calculating specified aggregations, and storing the results in the cube 18. Users are then able to query cube 18 after it has been processed in this manner. As shown, the invention horizontally partitions Target dimension 12 using the service level as the partition key to create a plurality of specific service-based Target dimensions 22 and using Target dimension 20 in the summary cube 28. In turn, the invention defines the processed summary cube 28 containing Target dimension 20. Those skilled in the art are familiar with joining multiple cubes into "virtual" cubes to maintain an optimal design for each cube while permitting data in the combined cubes to be accessed without the need for additional memory. In the illustrated embodiment, the processed summary cube 28 includes one or more sub-cubes of aggregated data, which may be virtualized to a logical cube 30.

Referring further to FIG. 4, each service member of Target dimension 12 has specific directory/page level information available on its own partitioned dimension 22 and, thus, on its own detail cube 26. The summary-detail architecture segregates the lower level data by service. In the illustrated embodiment, summary cube 28 contains two groups of physical cubes, i.e., a sub-cube for additive metrics (e.g., page views) and a sub-cube for non-additive metrics (e.g., unique user counts). As described above, the sub-cubes are virtualized to the logical cube 30 for convenience. Detail cubes 26 have the same dimensionality as summary cube 28 except their Target dimensions are partitioned and include the specific directory/page level dimension members. Each detail cube 26 in this embodiment contains a sub-cube for additive metrics (e.g., page views) and a sub-cube for non-additive metrics (e.g., unique user counts) and is virtualized into a logical cube 34.

Figure 5:
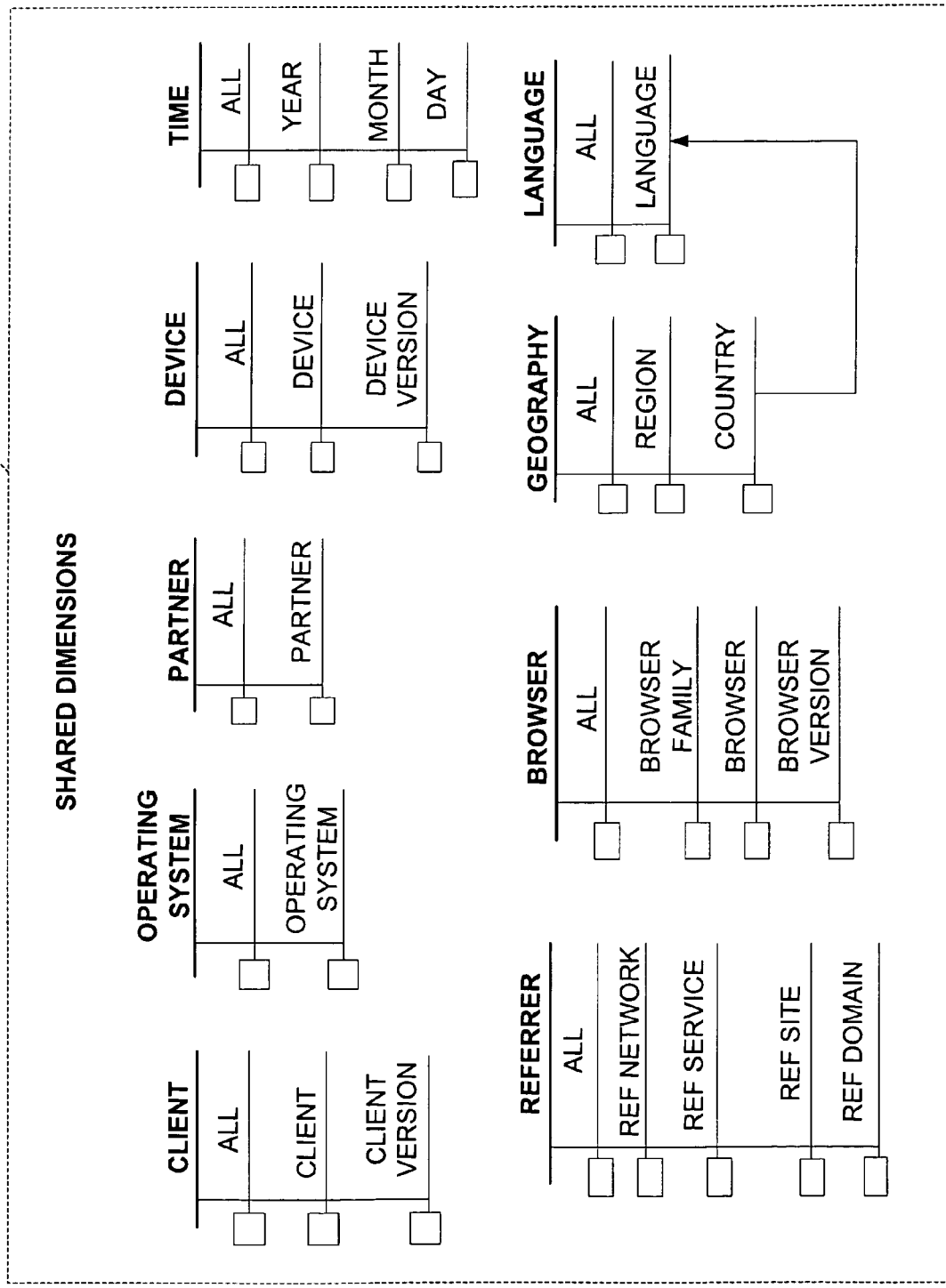
FIG. 5 is a diagram of exemplary shared dimensions according to the architecture of FIG. 4.

FIG. 4 also illustrates the relationship between summary cube 28 and a set of shared dimensions 36. According to the invention, the shared dimensions 36 are dimensions that can be used in any cubes within the database. FIG. 5 shows exemplary shared dimensions 36 according to one embodiment of the invention.

Advantageously, the horizontal partitioning strategy employed by the invention to create the summary-detail architecture has yielded dramatic improvements in processing efficiency. For example, the invention increases the speed at which large dimension databases can be processed by approximately 10 to 20 times without degrading performance. Moreover, the summary-detail architecture can be implemented on an existing OLAP service or analysis service framework. In this architecture, the summary cube provides a general business overview on a higher level (e.g., domain level and up). The service level-base detail cubes, on the other hand, enable users to drill down to lower levels (e.g., directory level and/or page level) without having to mingle with the large number of records on either of these levels. This functionality is analogous to navigating through a digital map: Users locate an address of interest and navigate from an overview map to a detail map by "zooming in" to the detail map with focus on the address.

It is to be understood that the invention contemplates horizontally partitioning more than one dimension 12. For example, partitioning a second dimension permits creating a two-dimension detail cube grid. On the other hand, implementing a second summary cube, if necessary, allows a different roll-up. In fact, the structure of cubes 18 permits many-to-many relationship in the summary-detail cube architecture.

Moreover, the present invention, through the implementation of detail cubes, implies "vertical partitioning" strategies for dimension 12 because it enables more "attributes/levels" to be included in the particular dimension.

Figure 6:
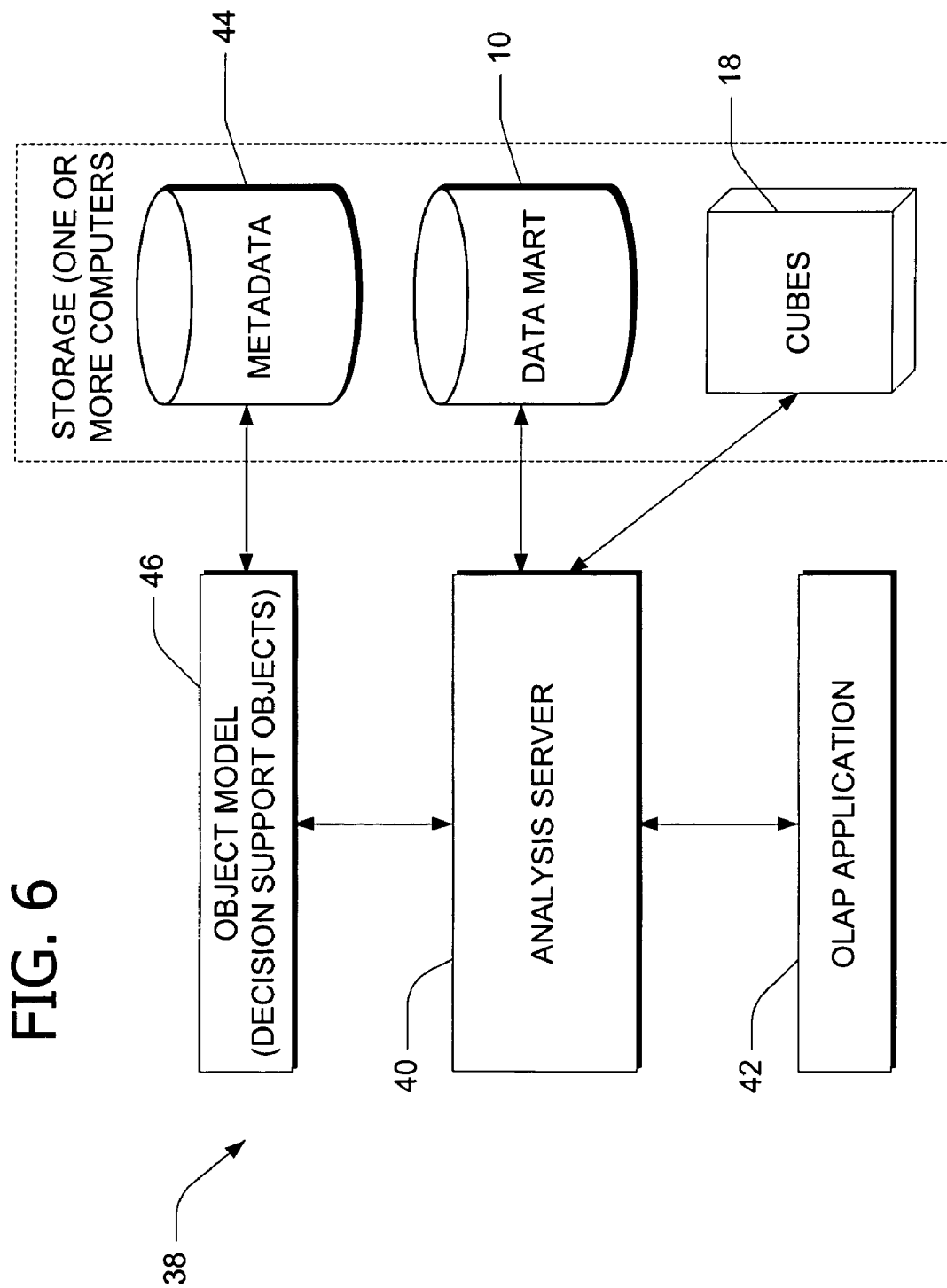
FIG. 6 is a block diagram illustrating a computer system suitable for implementing the invention.

Referring now to FIG. 6, a computer system 38 suitable for implementing the summary-detail architecture and other aspects of the invention is shown in block diagram form. The computer system 38 includes a server 40 for executing OLAP application 42 to perform, for example, Web usage analysis. The server 40 communicates with one or more databases associated with the same or different computers. As described above, one of the databases, shown at reference character 10, is the data mart storing dimensions 12 and facts 14 for processing. Server 40 runs the OLAP application 42 to access information in data mart 10 and to create cubes 18. By setting a partition key (e.g., the service name), system 38 creates the partitioned dimensions and the detail cubes associated with them. System 38 further creates XML metadata information about the dimension partitioning strategy and stores the files in a database 44. An object model application 46 reads the metadata for use by server 40.

Summary cubes 28 and detail cubes 26, shown generally at 18, can be deployed on the same or different servers without deviating from the scope of the invention. This architecture offers the flexibility of putting detail cubes 26 along with summary cube 28 or separating them into a different server. For example, one configuration available in the summary-detail architecture deploys detail cubes 26 and summary cube 28 on the same server and the same OLAP database. This configuration enables sharing the common dimensions between them. In this instance, summary cube 28 shares the same dimensionality as detailed cubes 26 (except the horizontally partitioned levels). In another configuration, the architecture deploys detail cubes 26 on one or more other servers to increase scalability.

Figure 7:
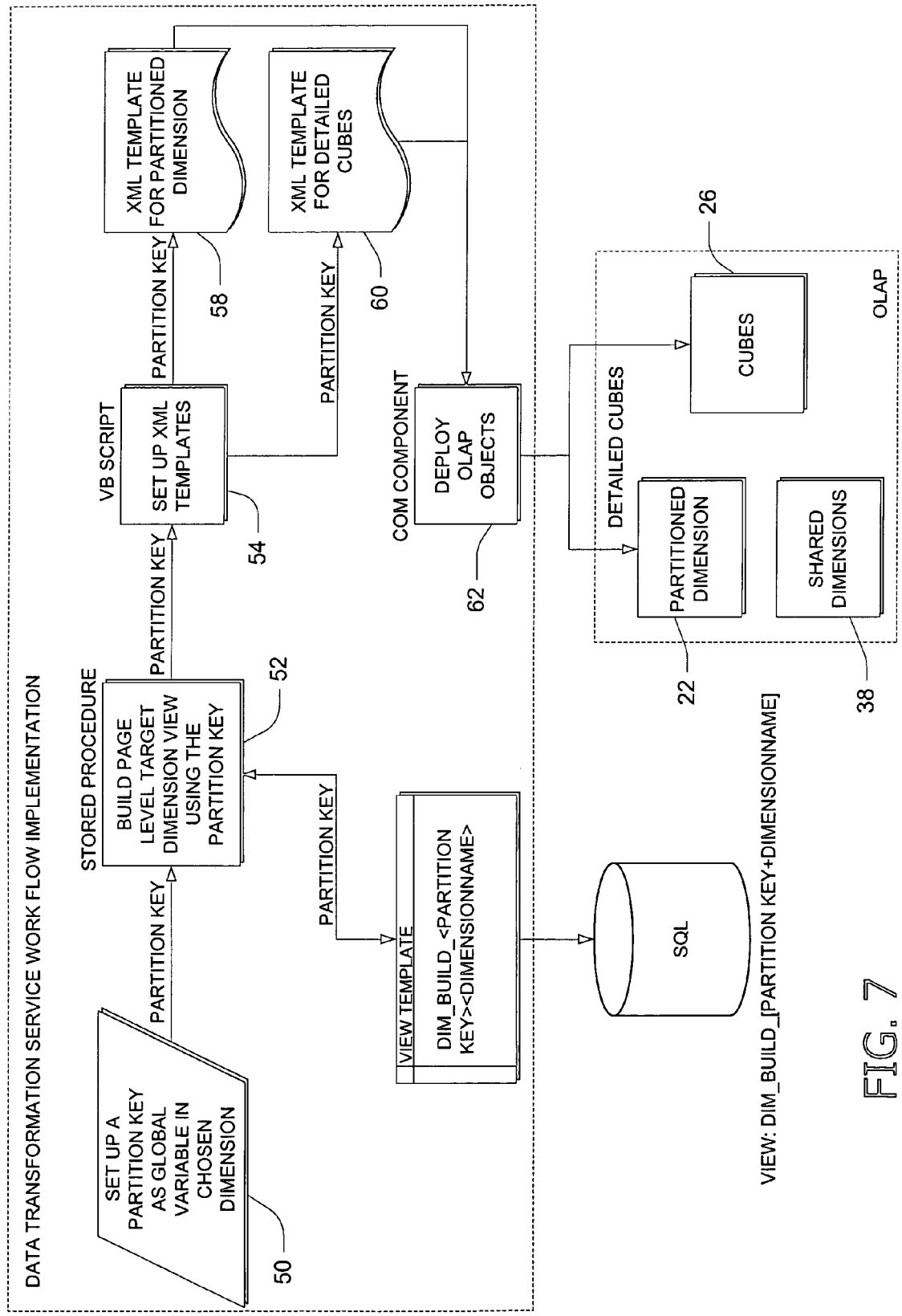
FIG. 7 is a flow diagram illustrating an exemplary workflow for cloning a detail cube according to the architecture of FIG. 4.

FIG. 7 shows an exemplary workflow for ensuring manageability of the architecture by automating the cloning of detail cubes 26. According to the invention, templates drive the workflow. In the context of a Web usage reporting OLAP application, detail cubes 26 are added when a new Web service is added to one of the networks. System 38 captures the metadata information about the dimension partitioning strategy and detail cubes 26 in a set of tag-based files (e.g., XML files). The user decides which service detail cube to clone and the workflow performs the operations to deploy all necessary objects. The workflow creates a database view to horizontally partition the Target dimension 12, extending from domain level to directory/page levels. By setting the partition key (in this case, the new service name) at data block 50, the workflow executes to create partitioned dimensions 22 at process 52. By parsing the OLAP services' object model to the XML elements (e.g., Decision Support Objects), system 38 carries out the creation of the XML metadata files. The XML metadata files then are revised to two templates set up at process 54. Proceeding to documents 58 and 60, one template corresponds to the partitioned Target dimension 22 and the other template corresponds to detailed cubes 26 (including their physical sub-cubes and virtual cube 34). In other words, system 38 uses the XML templates and the new service name to create the XML metadata for the OLAP dimension and cubes to be created. At process 62, system 38 applies a COM-based application to read the XML metadata and deploy the OLAP objects to the OLAP services (e.g., the DSO application 46). It is to be understood that tag-based languages other than XML may be used to templatize the metadata.

Referring now to FIG. 8, yet another aspect of the invention improves usability through client-side zoom in/zoom out functionality. As shown in the block diagram of FIG. 8, the summary and detail cubes 28, 26 have identical dimensionality. Users can navigate from summary cube 28 to detail cube 26 seamlessly. This navigation functionality, referred to as zoom in/zoom out is analogous to navigating through different scales of digital maps or focusing on targeted objects when taking photographs. In this instance, XML metadata files configured to identify the behavior of the zoom in/zoom out events enable the functionality. The zoom in feature of the invention provides drill through to detailed cubes 26 with the same dimensionality, preserving selections and filters. Conversely, the zoom out feature provides roll up to summary cube 28 with the same dimensionality, again preserving selections and filters.

In one embodiment, system 38 enables the zoom in/zoom out events based on the context in which the users interact and stores their definitions in XML metadata 44. When a new action is added, no coding is required and the user simply adds a new entry for the action in the XML metadata. To a certain extent, traditional drill across and drill through events can be implemented in a similar manner.

Advantageously, system 38 permits both zooming in from summary to detail and zooming out from detail cube to summary cube. In contrast, conventional drill down and roll up implementations do not support pointing to different physical cubes so their dimensions can be dealt with separately. As a result, the performance of conventional drill down and roll up navigation features is constrained by the number of records existing in dimensions.

In an alternative embodiment, the invention implements the zoom in/zoom out functionality on a middle-tier, as opposed to client-side, to offer improved reference-ability among data from different data stores and better scalability for query-time performance.

FIG. 9 shows one example of a general purpose computing device in the form of a computer 70. In one embodiment of the invention, a computer such as the computer 70 is suitable for use as any of the computers described above, including servers 40.

In the illustrated embodiment, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 9 illustrates operating system 84, application programs 86, other program modules 88, and program data 90.

The computer 70 may also include other removable/non-removable, volatile/nonvolatile computer storage media. For example, FIG. 9 illustrates a hard disk drive 94 that reads from or writes to non-removable, nonvolatile magnetic media. FIG. 9 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 9, provide storage of computer readable instructions, data structures, program modules and other data for the computer 70. In FIG. 9, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 9 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 136 via the user input interface 124, or other appropriate mechanism. In a networked environment, program modules depicted relative to computer 70, or portions thereof, may be stored in a remote memory storage device (not shown). By way of example, and not limitation, FIG. 9 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

The invention achieves beneficial results through the use of a summary-detail cube architecture for a large-scale, enterprise OLAP application, which presents effective Web usage reports for entire networks of sites. The invention is particularly well suited for processing large dimensions. The summary-cube architecture further enables OLAP reporting services from summary to detail levels without incurring a performance penalty. In summary, the present invention overcomes deficiencies in the prior art associated with large dimensions, namely, scalability, usability, and manageability. With respect to scalability, the summary-detail cube architecture partitions large dimensions horizontally and, thus, the implementation can predict a linear scaling performance. The zoom in/zoom out functionality improves usability by facilitating the natural drill-path for analyzing detailed information in a summary-detail cube architecture. Users can navigate easily and find dimensions of interest quickly for analysis. The XML template driven workflow implementation automates the cloning of the detail cubes to improve manageability. The workflow implementation reduces the potential overhead for maintaining the OLAP application when additional detail cubes need to be added.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. One or more computer readable storage media having a data structure stored thereon, said data structure comprising:

a general dimension containing members in a plurality of levels, said levels being organized according to a hierarchy in which descending levels in the hierarchy are defined by increasing specificity;

a summary cube containing the members of at least one upper level of the general dimension; and a detail cube, said detail cube including a horizontally partitioned dimension containing a first subset of the members of at least one lower level of the general dimension, said lower level associated with the partitioned dimension being lower in the hierarchy than the upper level associated with the summary cube, said general dimension being horizontally partitioned based on a selected member of the upper level to form the horizontally partitioned dimension, said first subset of the members of the lower level corresponding to the selected member of the upper level.

2. The data structure of claim 1 wherein the detail cube includes one or more sub-cubes containing aggregations of the first subset of the members of the lower level from the partitioned dimension.

3. The data structure of claim 2 wherein the detail cube comprises a first sub-cube for additive metrics and a second sub-cube for non-additive metrics.

4. The data structure of claim 3 wherein the first and second sub-cubes are combined to form a virtual cube.

5. The data structure of claim 3 wherein the additive metrics include page views.

6. The data structure of claim 3 wherein the non-additive metrics include unique user counts.

7. The data structure of claim 1 wherein the partitioned dimension contains the members of the upper level associated with the summary cube in addition to the first subset of the members of the lower level associated with the partitioned dimension.

8. The data structure of claim 1 further comprising another partitioned dimension containing a second subset of the members of the lower level, said general dimension being partitioned based on another selected member of the upper level to form the other partitioned dimension, said second subset of the members of the lower level corresponding to the other selected member of the upper level.

9. The data structure of claim 1 wherein the data structure is modeled according to a star dimensional model schema.

10. The data structure of claim 1 wherein the data structure is an OLAP database.

11. The data structure of claim 1 further comprising one or more shared dimensions.

12. The data structure of claim 1 wherein the general dimension contains at least about 500,000 members.

13. The data structure of claim 1 wherein the members of the general dimension represent Web usage information.

14. The data structure of claim 13 wherein the Web usage information is organized into two or more of the following levels: network, service, site, domain, directory, and page.

15. The data structure of claim 14 wherein the upper level associated with the summary cube comprises the service level and wherein the selected member represents a selected Web service.

16. The data structure of claim 15 wherein the partitioned dimension contains data representing directory information for the selected Web service.

17. The data structure of claim 15 wherein the partitioned dimension contains data representing page view information for the selected Web service.

18. A method of processing data in a multidimensional database comprising:
    defining a plurality of dimensions, each dimension containing members of a plurality of levels, said levels being organized according to a hierarchy in which descending levels in the hierarchy are defined by increasing specificity;
    horizontally partitioning at least one of the dimensions based on a selected member of an upper level of the dimension to be partitioned, said partitioned dimension containing a first subset of the members of at least one lower level of the dimension to be partitioned;
    defining a detail cube, said detail cube including the partitioned dimension; and
    defining a summary cube containing the members of an upper level of the partitioned dimension, said upper level associated with the summary cube being higher in the hierarchy than the lower level associated with the partitioned dimension.

19. The method of claim 18 wherein said detail cube includes one or more sub-cubes containing aggregations of the first subset of the members of the lower level from the partitioned dimension.

20. The method of claim 19 further comprising combining the first and second sub-cubes to form a virtual cube.

21. The method of claim 19 wherein the detail cube comprises a first sub-cube for additive metrics and a second sub-cube for non-additive metrics.

22. The method of claim 21 wherein the additive metrics include page views.

23. The method of claim 21 wherein the non-additive metrics include unique user counts.

24. The method of claim 19 further comprising extracting information from the summary and detail cubes using an OLAP application.

25. The method of claim 19 further comprising implementing a workflow with an XML template to automatically create another partitioned dimension and another detail cube database, said other partitioned dimension containing a second subset of the members of the lower level of the dimension, said second subset of the members of the lower level being partitioned from the dimension based on another selected member of the upper level, said other detail cube including the other partitioned dimension component and one or more sub-cubes containing aggregations of the second subset of the members of the lower level from the other partitioned dimension.

26. The method of claim 25 wherein implementing a workflow with an XML template includes defining the other partitioned dimension based on a user-specified partition key and defining the other detail cube based on the user-specified partition key.

27. The method of claim 26 wherein the partition key is representative of the other selected member of the upper level.

28. The method of claim 27 wherein implementing a workflow with an XML template includes creating an XML metadata file for storing information to define the other partitioned dimension and the other detail cube, and further comprising reading the XML metadata file and deploying OLAP objects for creating the other partitioned dimension and the other detail cube using a COM-based application.

29. The method of claim 19 wherein the partitioned dimension contains the members of the upper level associated with the summary cube in addition to the first subset of the members of the lower level associated with the partitioned dimension and wherein the detail cube and the summary cube have the same dimensionality.

30. The method of claim 29 further comprising implementing zoom in/zoom out events to navigate between information in the summary cube and information in the detail cube.

31. The method of claim 30 wherein the zoom in event comprises a drill through from the summary cube to the detail cube.

32. The method of claim 30 wherein the zoom out event comprises a roll up from the detail cube to the summary cube.

33. The method of claim 30 wherein implementing zoom in/zoom out events comprises configuring an XML metadata file to identify zoom in/zoom out events behavior.

34. The method of claim 18 wherein the partitioned dimension contains the members of the upper level associated with the summary cube in addition to the first subset of the members of the lower level associated with the partitioned dimension.

35. The method of claim 18 further comprising partitioning another dimension based on another selected member of the upper level, said other partitioned dimension containing a second subset of the members of the lower level corresponding to the other selected member of the upper level.

36. The method of claim 18 wherein defining the dimensions includes modeling the data in the multidimensional database according to a star dimensional model schema.

37. The method of claim 18 wherein the dimension to be partitioned contains at least about 500,000 members.

38. The method of claim 18 wherein the members of the dimension to be partitioned represent Web usage information.

39. The method of claim 38 wherein the Web usage information is organized into two or more of the following levels: network, service, site, domain, directory, and page.

40. The method of claim 39 wherein the upper level associated with the summary cube comprises the service level and wherein the selected member represents a selected Web service.

41. The method of claim 40 wherein the partitioned dimension contains data representing directory information for the selected Web service.

42. The method of claim 40 wherein the partitioned dimension contains data representing page view information for the selected Web service.

43. One or more computer-readable storage media having computer-executable instructions for performing the method of claim 18.

44. One or more computer-readable storage media having computer-executable components for processing data, said data being organized in a dimension containing members in a plurality of levels, said levels being organized according to a hierarchy in which descending levels in the hierarchy are defined by increasing specificity, said components comprising:

a summary cube database component storing the members of an upper level of the dimension;

a first partitioned dimension component containing a first subset of the members of at least one lower level of the dimension, said lower level associated with the first partitioned dimension component being lower in the hierarchy than the upper level associated with the summary cube database component, said first subset of the members of the lower level being partitioned from the dimension based on a selected member of the upper level;

a first detail cube database component including the first partitioned dimension component and one or more sub-cubes containing aggregations of the first subset of the members of the lower level from the first partitioned dimension component; and a template component for implementing a workflow to automatically create a second partitioned dimension component and a second detail cube database component, said second partitioned dimension component containing a second subset of the members of the lower level of the dimension, said second subset of the members of the lower level being partitioned from the dimension based on another selected member of the upper level, said second detail cube database component including the second partitioned dimension component and one or more sub-cubes containing aggregations of the second subset of the members of the lower level from the second partitioned dimension component.

45. The computer-readable media of claim 44 wherein the template component includes a partition template for defining the second partitioned dimension component based on a user-specified partition key and a cube template for defining the second detail cube database component based on the user-specified partition key.

46. The computer-readable media of claim 45 wherein the partition key is representative of the other selected member of the upper level.

47. The computer-readable media of claim 45 wherein the workflow implemented by the template component creates a metadata file storing information for use in defining the second partitioned dimension component and the second detail cube database component, and further comprising a COM-based application for reading the metadata file and deploying OLAP objects for creating the second partitioned dimension component and the second detail cube database component.

48. One or more computer-readable storage media having computer-executable components for processing data, said data being organized in a dimension containing members in a plurality of levels, said levels being organized according to a hierarchy in which descending levels in the hierarchy are defined by increasing specificity, said components comprising:

a summary cube database component storing the members of an upper level of the dimension;

a partitioned dimension component containing a subset of the members of at least one lower level of the dimension, said lower level associated with the partitioned dimension component being, lower in the hierarchy than the upper level associated with the summary cube database component, said subset of the members of the lower level being partitioned from the dimension based on a selected member of the upper level, said partitioned dimension component further containing the members of the upper level associated with the summary cube database component;

a detail cube database component including the partitioned dimension component and one or more sub-cubes containing aggregations of the subset of the members of the lower level from the partitioned dimension component; said detail cube database component and said summary cube database component having the same dimensionality; and a navigation component for implementing zoom in/zoom out events to navigate between information in the summary cube database component and information in the detail cube database component.

49. The computer readable media of claim 48 wherein the zoom in event comprises a drill through from the summary cube database component to the detail cube database component.

50. The computer readable media of claim 48 wherein the zoom out event comprises a roll up from the detail cube database component to the summary cube database component.

51. The computer readable media of claim 48 wherein the navigation component comprises a metadata file configured to identify zoom in/zoom out events behavior.

52. A method of performing clickstream analysis from Web usage data in a multidimensional database, said method comprising:

defining it target dimension, said target dimension containing members of a plurality of levels, said levels including a service level containing members representative of a plurality of Web services, said levels being organized according to a hierarchy in which descending levels in the hierarchy are defined by increasing specificity;

horizontally partitioning the target dimension based on a selected member of the service level, said partitioned dimension containing a first subset of the members of at least one level of the target dimension lower in the hierarchy than the service level;

defining a detail cube, said detail cube including the partitioned dimension; and defining a summary cube containing the members of the service level of the target dimension.

53. The method of claim 52 wherein said detail cube includes one or more sub-cubes containing aggregations of the first subset of the members of the lower level from the partitioned dimension.

54. The method of claim 53 wherein the detail cube comprises a first sub-cube for page views and a second sub-cube for unique user counts.

55. The method of claim 53 further comprising combining the sub-cubes to form a virtual cube.

56. The method of claim 53 further comprising extracting clickstream information from the summary and detail cubes using an OLAP application.

57. The method of claim 52 wherein the partitioned dimension contains the members of the upper level associated with the summary cube in addition to the first subset of the members of the lower level associated with the partitioned dimension.

58. The method of claim 52 wherein the target dimension has two or more of the following levels of Web usage information: network, service, site, domain, directory, and page.

59. The method of claim 52 wherein the partitioned dimension contains data representing directory information for the Web service represented by the selected member of the service level.

60. The method of claim 52 wherein the partitioned dimension contains data representing page view information for the Web service represented by the selected member of the service level.

* * * * *

UNITED STATES PATENT AND TRADEMARK OFFICE
CERTIFICATE OF CORRECTION

PATENT NO. : 6,980,980 B1
APPLICATION NO. : 10/050663
DATED : December 27, 2005
INVENTOR(S) : Yeh It is certified that error appears in the above-identified patent and that said Letters Patent is hereby corrected as shown below:

In column 12, line 20, in Claim 1, delete "said" and insert -- the --, therefor.

In column 12, line 23, in Claim 1, delete "said" and insert -- the --, therefor.

In column 12, line 28, in Claim 1, delete "said" and insert -- the --, therefor.

In column 12, line 31, in Claim 1, delete "said" and insert -- the --, therefor.

In column 12, line 33, in Claim 1, delete "said" and insert -- the --, therefor.

In column 12, line 36, in Claim 1, delete "said" and insert -- the --, therefor.

In column 15, line 5, in Claim 44, delete "said" and insert -- the --, therefor.

In column 15, line 7, in Claim 44, delete "said" and insert -- the --, therefor.

In column 15, line 9, in Claim 44, delete "said" and insert -- the --, therefor.

In column 15, line 15, in Claim 44, delete "said" and insert -- the --, therefor.

In column 15, line 18, in Claim 44, delete "said" and insert -- the --, therefor.

In column 15, line 30, in Claim 44, delete "said" and insert -- the --, therefor.

In column 15, line 32, in Claim 44, delete "said" and insert -- the --, therefor.

UNITED STATES PATENT AND TRADEMARK OFFICE
CERTIFICATE OF CORRECTION

PATENT NO. : 6,980,980 B1
APPLICATION NO. : 10/050663
DATED : December 27, 2005
INVENTOR(S) : Yeh It is certified that error appears in the above-identified patent and that said Letters Patent is hereby corrected as shown below:

In column 15, line 35, in Claim 44, delete "said" and insert -- the --, therefor.

In column 15, line 41, in Claim 45, after "computer-readable" insert -- storage --.

In column 15, line 47, in Claim 46, after "computer-readable" insert -- storage --.

In column 15, line 50, in Claim 47, after "computer-readable" insert -- storage --.

In column 15, line 60, in Claim 48, delete "said" and insert -- the --, therefor.

In column 15, line 62, in Claim 48, delete "said" and insert -- the --, therefor.

In column 15, line 64, in Claim 48, delete "said" and insert -- the --, therefor.

In column 16, line 3, in Claim 48, delete "said" and insert -- the --, therefor.

In column 16, line 4, in Claim 48, delete "being, lower in" and insert -- being lower on --, therefor.

In column 16, line 6, in Claim 48, delete "said" and insert -- the --, therefor.

In column 16, line 8, in Claim 48, delete "said" and insert -- the --, therefor.

In column 16, line 16, in Claim 48, delete "said" and insert -- the --, therefor.

UNITED STATES PATENT AND TRADEMARK OFFICE
CERTIFICATE OF CORRECTION

PATENT NO.       : 6,980,980 B1
APPLICATION NO.  : 10/050663
DATED            : December 27, 2005
INVENTOR(S)      : Yeh It is certified that error appears in the above-identified patent and that said Letters Patent is hereby corrected as shown below:

In column 16, line 17, in Claim 48, delete "said" and insert -- the --, therefor.

In column 16, line 23, in Claim 49, after "computer readable" insert -- storage --.

In column 16, line 27, in Claim 50, after "computer readable" insert -- storage --.

In column 16, line 31, in Claim 51, after "computer readable" insert -- storage --.

In column 16, line 37, in Claim 52, after "defining" delete "it" and insert -- a --, therefor.

Signed and Sealed this

Fourth Day of August, 2009

JOHN DOLL
*Acting Director of the United States Patent and Trademark Office*